Jan. 27, 1925.
R. M. BERRY
FILTERING APPARATUS
Filed June 15, 1921
1,524,419
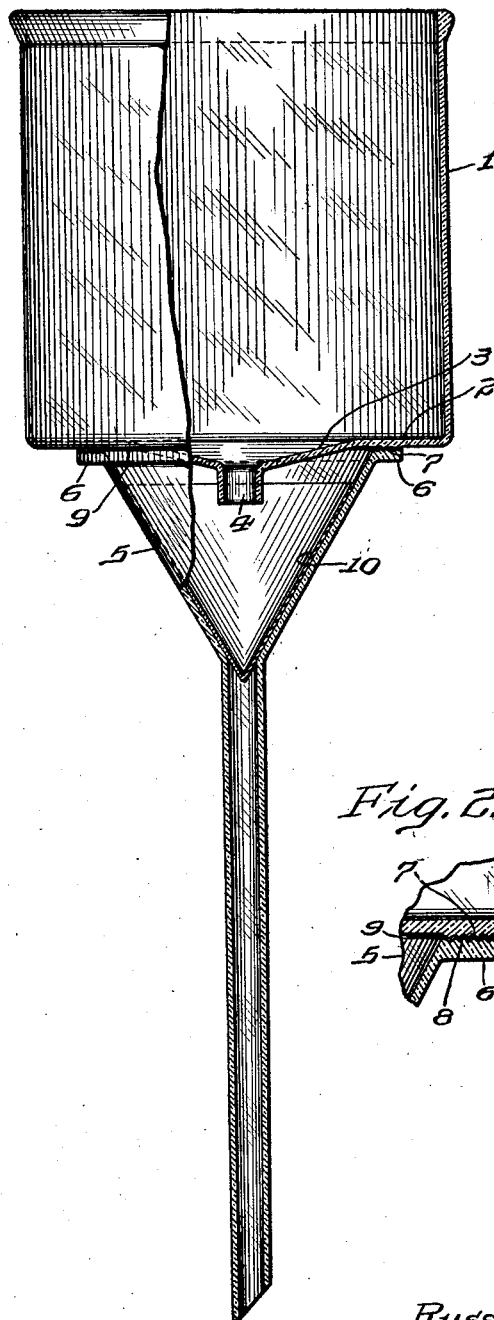
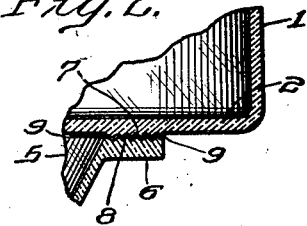
INVENTOR
Russell M. Berry,
WITNESS
BY
ATTORNEYS Patented Jan. 27, 1925.

1,524,419

UNITED STATES PATENT OFFICE.

RUSSELL M. BERRY, OF PHILADELPHIA, PENNSYLVANIA.

FILTERING APPARATUS.

Application filed June 15, 1921. Serial No. 477,627.

*To all whom it may concern:*

Be it known that I, RUSSELL M. BERRY, a citizen of the United States, and a resident of the city of Philadelphia, county of Philadelphia, and State of Pennsylvania, have invented certain new and useful Improvements in Filtering Apparatus, of which the following is a specification, reference being had to the accompanying drawing.

A principal object of my invention is to provide a filtering apparatus in which the flow of the liquid from a reservoir or container to the filtering medium is automatically maintained at a rate equal to that of the filtered liquid through and away from the said medium.

A further object of my invention is to provide a filtering apparatus with means preventing overflow of the liquid from the filtering medium.

A still further object of my invention is to provide a filtering apparatus in which the liquid to be filtered is automatically fed to the filtering medium, thus avoiding constant replenishment of the liquid in the filler by the chemist, druggist or other operator.

A still further object of my invention is to provide a filtering apparatus in which retardation of the filtering by the filling up or clogging of the filtering medium by the solid matter is substantially reduced.

A still further object of my invention is to provide a filtering apparatus in which the rate at which the material being filtered is fed or supplied to the filtering medium is automatically regulated or controlled and in which liquids throwing off steam or other vapors may be filtered.

My invention further includes all of the other various objects and novel features of construction and arrangement hereinafter more definitely specified and described.

In the accompanying drawing I have illustrated one embodiment of my invention in which Figure 1 is an elevation and partial section and Fig. 2 a fragmentary detail view in section.

The form of the invention illustrated in the drawing comprises a reservoir or container 1 which may be made of porcelain, glass, or any other suitable material, open at its top, the bottom being provided with a flat portion 2 and preferably with a downwardly sloping portion 3 terminating in the neck or outlet 4. I find that by making the central portion of the bottom downwardly sloping the flow of the liquid through the outlet is assisted but it will be understood that this is not a principal feature of my invention.

A funnel is shown at 5 which may be made of porcelain, glass or other suitable material and upon the upper edge of the funnel is formed a circumferential shoulder or flange 6, the upper surface 7 of which is preferably roughened by grinding or otherwise for the purpose hereinafter described. The under surface 8 of the flat portion 2 of the reservoir 1 may be likewise partly or wholly roughened. In mounting the container upon the funnel I have found it desirable to apply a grease or wax 9, such as vaseline or paraffine, of high viscosity to the roughened surface of the shoulder or flange 6 or to the roughened surface of the bottom 2 of the container or to both surfaces so that an air-tight joint is formed by the oppositely disposed roughened surfaces and the layer of grease therebetween. It will be understood my invention is not limited to this particular form of air-tight joint but comprehends any other means to render the joint air-tight.

At 10 is shown a filtering medium which may be of filter paper, cloth, or any other suitable material, the filtering medium being disposed within the funnel in the usual manner but with its upper edge above the level of the mouth of the outlet or discharge neck 4.

In carrying out the filtering by my improved invention, the container or reservoir, filtering medium and funnel having been assembled as shown in the drawing and as hereinabove described, the stem of the funnel feeding into a receptacle, the liquid is poured into the container 1, which may be wholly or partly filled, from which it passes through the outlet 4 into the filtering medium 10 carried by the funnel 5 until the surface of the liquid within the filtering medium rises to the level of the mouth of the outlet 4 at which point further rise of the liquid within the filtering medium is substantially prevented by the pressure of the air trapped in the chamber formed by the surface of the liquid within the funnel, the funnel, the outlet and the portion of the bottom of the container 1 covered by the funnel. As hereinabove indicated, the escape of the air between the funnel and the container is prevented by the air-tight joint formed by the roughened surfaces and the interposed layer of grease or other suitable material. It will be further seen that flow of the liquid over the upper edge of the filtering medium is prevented, the upper edge of the filter being above the outlet end of the discharge neck above which the liquid in the filtering medium does not substantially rise. As the liquid filters through the filtering medium a corresponding amount of liquid is simultaneously discharged from the container into the filtering medium, the level of the liquid in the filtering medium remaining at substantially the same point until all of the liquid has been discharged from the reservoir or container 1.

I have also found that owing to the fact that the air is trapped in the funnel as above described, it is subjected to a pressure per square inch sufficient to counterbalance the weight of a column of the liquid having a height equal to that of the level of the liquid in the reservoir or container 1. The liquid in the funnel 5 is therefore subjected to that pressure, which is practically equal to that of the compressed trapped air. The result is that the rate of filtration is rapid.

By thus being able to maintain the level of the liquid in the funnel up to a point close to the top edge of the filtering medium, and thereby practically simultaneously utilizing all of the filtering medium, and by subjecting the liquid being filtered to pressure as above described, the column of filtered liquid in the stem of the funnel may be maintained unbroken. This is also an advantage because the weight of the said unbroken column of filtered liquid materially assists in expediting the passage of the liquid through the filtering medium.

It will be understood that my improved filtering apparatus is not only useful to the chemist and the druggist or to others requiring apparatus of comparatively small capacity but may be also utilized to any scale of capacity in industrial manufacture.

While I have herein described with considerable particularity a preferred embodiment of my invention, I do not thereby desire or intend to limit myself to any precise details of construction and arrangement of parts as the same may be modified and varied in minor particulars from those shown in the drawings and herein described without departing from the spirit and scope of the invention as defined in the appended claims.

Having thus described my invention, I claim and desire to protect by Letters Patent of the United States:

1. A filtering apparatus comprising a funnel, a filtering medium within said funnel, a container seated upon the upper end of said funnel and having an outlet to discharge liquid into said filtering medium, the contacting surfaces of said container and said funnel being roughened and grease interposed therebetween.

2. A filtering apparatus comprising a funnel having a circumferential flange about its upper end, a filtering medium within said funnel, a container seated upon said flange and having an outlet to discharge liquid into said filtering medium, the contacting surfaces of said container and of said flange being roughened and grease interposed between said contacting surfaces.

3. A filtering apparatus comprising a funnel, a filtering medium within said funnel, an open container seated upon the upper end of said funnel having an outlet to discharge liquid into said filtering medium, the end of said outlet being lower than the upper edge of said filtering medium and means making the joint between said container and said funnel air-tight.

4. A filtering apparatus comprising a funnel, a filtering medium within said funnel, an open container seated upon the upper end of said funnel having an outlet to discharge liquid into said filtering medium, the end of said outlet being lower than the upper edge of said filtering medium.

In witness whereof, I have hereunto set my hand this 14th day of June, A. D. 1921.

RUSSELL M. BERRY.